July 28, 1936.   E. A. J. ERICSSON   2,049,361
WIRE OR RIBBON TIGHTENING APPARATUS
Filed Dec. 29, 1934
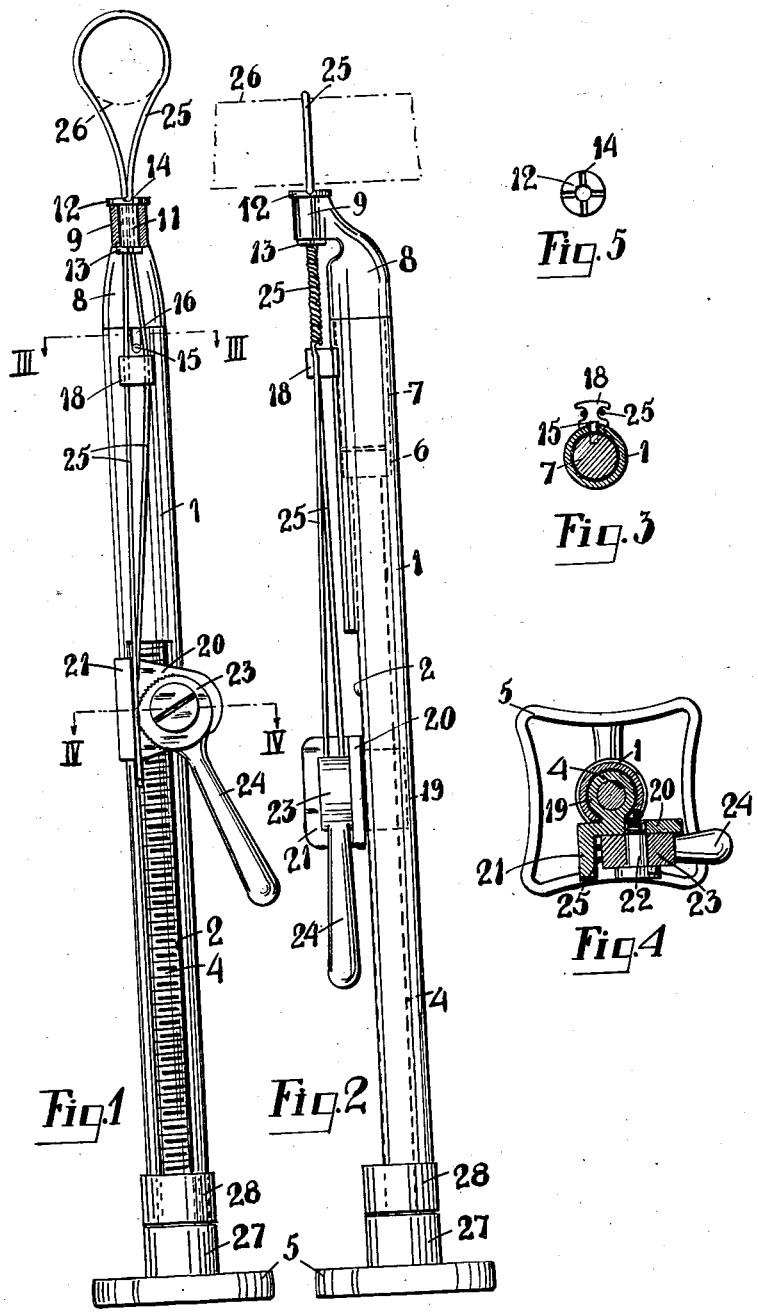

Patented July 28, 1936

2,049,361

UNITED STATES PATENT OFFICE 2,049,361

WIRE OR RIBBON TIGHTENING APPARATUS

Ernst Axel Johan Ericsson, Gothenburg, Sweden

Application December 29, 1934, Serial No. 759,780
In Sweden October 27, 1934

2 Claims. (Cl. 128—92)

The present invention relates to wire or ribbon tightening apparatus particularly of the kind used in the surgery in the treatment of fractures.

The invention has for its object to provide an apparatus of the kind referred to which is reliable and handy in use, simple in construction and cheap in manufacture.

An embodiment of the invention is illustrated in the accompanying drawing in which:

Fig. 1 is a side elevation of the apparatus partly in section and receiving a wire not yet tightened.

Fig. 2 shows the same apparatus from another side and with the wire tightened and twisted.

Fig. 3 is a cross section of the apparatus on the line III—III of Fig. 1.

Fig. 4 is a cross section of the apparatus on the line IV—IV of Fig. 1.

Fig. 5 is a view of a detail.

In the drawing, 1 denotes a tubular socket which along a portion of its length has a longitudinal recess or opening 2. The socket 1 constitutes the frame of the apparatus and receives a threaded spindle or screw 4 which is rotatably journalled therein and operated by a handle 5 attached to one end of the screw, the opposite end thereof being journalled in a member 6 attached in the socket. In the end of the socket 1 opposite to the handle 5 a stem 7 is inserted, the extension 8 of which outside the socket terminates in a portion 9 eccentrically positioned in relation to the centre line or axis of the screw 4 or the socket 1 respectively. Said portion 9 is perforated by a preferably cylindrical hole which is likewise positioned eccentrically and the axis line of which is substantially parallel with the axis line of the screw or socket respectively. Said hole constitutes the eye of the apparatus, and, if the wire is to be twisted after being tightened, this hole should receive a small sleeve or socket 11 which is free to rotate about its axis line in the hole and provided with an outer and an inner flange 12 and 13 respectively preventing the sleeve 11 from losing its seat in the hole. The outer flange 12 has radial grooves 14 (see also Fig. 5 which shows the outer end of the sleeve 11).

In order to prevent rotation of the stem 7 in relation to the socket 1, a pin 15 is attached to said stem and engages with a longitudinal groove 16 in the socket 1.

Approximately in the extension of the axis line of the sleeve 11, a substantially T-shaped member 18 is attached to the frame socket 1, said member serving as a separator for the wire portions 25 in the twisting thereof.

The screw 4 engages with the thread of a nut 19 which is prevented from rotation upon the screw by a plate 20 connected with the nut 19 and projecting beyond the edges of the recess or opening 2. At one side this plate is formed with a portion 21 forming an angle with the plate and designed to co-operate with a grooved eccentric 23 which is movable by a handle or lever 24 about a pin 22 attached to the plate 20 so that the ends of the wire or ribbon can be fastened between the portion 21 and the eccentric 23.

When a wire 25 is to be tightened about an object 26 (for instance a fractured bone) a piece of a wire of suitable length is caused to embrace said object with the middle portion of the wire which forms a loop around the object 26 substantially as shown by Fig. 1. The ends of the wire are passed through the eye formed by the hole in the portion 9 or in the socket 11 respectively, and the two portions of the wire 25 are caused to pass on each side of the separator 18 to the clamping device 21, 23 by means of which the ends of the wire are fastened to the nut 19. By rotation of the screw 4 in suitable direction the nut with the clamping device is caused to move towards the handle 5 whereby the apparatus and the object are pulled towards each other. When the flange 12 has been moved close to the objects 26, the wire has been tightened about the object. If the ends of the wire now are to be united, this is best done by twisting the portions of the wire between the object 26 and the separator 18. The twisting is effected by turning the apparatus substantially about the axis line of the sleeve 11. In this work one holds the apparatus by means of the handle 5. In the twisting in this manner the spindle 4 does not rotate in relation to the frame socket 1 in spite of the fact that no particular locking device between the spindle and the frame socket is provided. By the pull in the stretched wire 25 and due to the lever formed by the member 20, 21 the thread of the nut 19 is forced so powerfully against the thread of the spindle 4 that only by the friction caused thereby the socket and spindle are held in the same mutual position during the twisting operation.

When the portions of the wire between the object 26 and the separator 18 have been twisted about each other a certain number of revolutions, these portions break off at a point between the sleeve 11 and the separator 18 whereupon the tightening of the wire about the object in question and the uniting of the ends of the wire are completed.

Due to the fact that the sleeve 11 is rotatable in the hole of the portion 9, the wire portions in the twisting will not be broken off too soon. In the final phase of the twisting the portions of the wire will pass through two opposite grooves 14 in the flange 12 so that the sleeve 11 does not participate in the rotation of the apparatus.

For wires of different thicknesses eyes of different widths are required, and this, in first instance, is the reason why the eye (by means of the stem 7) is detachably secured to the frame socket 1.

In the use of ribbons instead of wires it may be suitable to unite the ends of the ribbon in any other way than by twisting. In such a case the separator 18, which is especially provided for twisting, is not required.

In the use of a wire as well as of a ribbon the ends thereof can be readily passed through the eye and attached to the clamping device, and when tightening the wire or ribbon the operator is able to overlook practically the whole length thereof since the wire or ribbon from the eye to all of its length is located outside the frame socket 1.

27 denotes the hub of the handle and 28 a sleeve embracing the adjacent end of the frame socket 1 and attached thereto.

Without further description it is thought that the features and advantages of the invention will be readily apparent to those skilled in the art, and it will, of course, be understood that changes in form, proportion and details of construction may be resorted to without departing from the spirit of the invention.

What I claim is:

1. A wire or ribbon tightening apparatus comprising a frame socket, a screw journalled in said frame socket, a nut carried by said screw and adapted to be moved along the frame socket by the rotation of said screw, a clamping device carried by said nut, an apertured member carried by said frame socket and positioned eccentrically with respect to said screw, a sleeve rotatably fitted within the aperture of said member, providing an eye through which may pass the wire or ribbon to be tightened and the wire or ribbon to be tightened when passed through said eye and attached to said clamping device will be positioned throughout its length exteriorly of said frame socket.

2. A wire tightening and twisting apparatus comprising a frame, a screw journalled in said frame, a nut engageable with said screw and adapted to be moved longitudinally of said frame by the rotation of said screw, a clamping device carried by said nut, a member carried by the frame, a sleeve rotatably journalled in said member, said sleeve forming an eye through which the ends of the wire are inserted and connected to said clamping device, and a separator for the wire portions carried by said frame.

ERNST AXEL JOHAN ERICSSON.